(12) United States Patent
Nishi et al.

(10) Patent No.: US 8,072,431 B2
(45) Date of Patent: Dec. 6, 2011

(54) INPUT/OUTPUT-INTEGRATED DISPLAY DEVICE AND PROTECTIVE GLASS PLATE USED THEREIN

(75) Inventors: Mizuki Nishi, Matsusaka (JP); Katsuto Tanaka, Matsusaka (JP); Hiroshi Honjo, Tokyo (JP); Hiromi Hase, Tokyo (JP)

(73) Assignee: Central Glass Company, Limited, Yamaguchi (JP)

( * ) Notice: Subject to any disclaimer, the term of this patent is extended or adjusted under 35 U.S.C. 154(b) by 986 days.

(21) Appl. No.: 11/917,691

(22) PCT Filed: Jul. 4, 2006

(86) PCT No.: PCT/JP2006/313283
§ 371 (c)(1),
(2), (4) Date: Dec. 14, 2007

(87) PCT Pub. No.: WO2007/004634
PCT Pub. Date: Jan. 11, 2007

(65) Prior Publication Data
US 2009/0079671 A1    Mar. 26, 2009

(30) Foreign Application Priority Data

Jul. 4, 2005   (JP) .................. 2005-195014

(51) Int. Cl.
G06F 3/03          (2006.01)
(52) U.S. Cl. ....................................... 345/173
(58) Field of Classification Search .......... 345/55, 345/173–183
See application file for complete search history.

(56) References Cited

U.S. PATENT DOCUMENTS

| | | | | |
|---|---|---|---|---|
| 3,323,797 | A | * | 6/1967 | Horton, Jr. ................. 473/29 |
| 4,859,636 | A | * | 8/1989 | Aratani et al. .............. 501/72 |
| 6,516,634 | B1 | * | 2/2003 | Green et al. ............. 65/30.14 |
| 2003/0080673 | A1 | * | 5/2003 | Ando ........................ 313/495 |
| 2005/0250639 | A1 | * | 11/2005 | Siebers et al. ............. 501/68 |

FOREIGN PATENT DOCUMENTS

| | | |
|---|---|---|
| JP | 6075213 | 3/1994 |
| JP | 2003-091356 | 3/2003 |
| JP | 2004240548 | 8/2004 |

OTHER PUBLICATIONS

JPO Website Machine English Translation of JP 2003-091356, Yasuki, Mar. 28, 2003.*
Written Opinion related to PCT/JP2006/313283.
Search Report related to WO2007/004634 AI.

* cited by examiner

*Primary Examiner* — Sophie Hon
(74) *Attorney, Agent, or Firm* — Husch Blackwell LLP

(57) ABSTRACT

The invention provides an input/output-integrated display device equipped with a means for inputting information through handwriting comprising a protective glass plate arranged as an outermost layer on the observation side of the device, leaving a space between the protective glass plate and a part of the device facing the same. The protective glass plate is a chemically reinforced glass plate prepared by immersing, in a molten salt bath, a glass plate produced according to the floating technique and has a Young's modulus of 71 to 74 GPa and a Poisson's ratio of 0.22 to 0.24 to thus chemically reinforce the same; the protective glass plate has the side serving as the top face upon the production of the glass plate according to the floating technique and the bottom face side opposite to the top face side; the surface compression stress on the top face side is 200 to 650 MPa; the protective glass plate is arranged such that the top face faces the space; and the protective glass plate is deflected towards the bottom face side at a warpage.

4 Claims, 2 Drawing Sheets

INPUT/OUTPUT-INTEGRATED DISPLAY DEVICE AND PROTECTIVE GLASS PLATE USED THEREIN

This application is a 371 of PCT/JP2006/313283 filed Jul. 4, 2006.

TECHNICAL FIELD

The present invention relates to an input/output-integrated display device, which makes use of a tablet plate to thus permit the input of information through handwriting using, for instance, an inputting pen and, more particularly, to a protective glass plate which permits the use of the display device over a quite long period of time.

BACKGROUND ART

There have already been put on the market various display devices each of which is so designed that a display panel, for instance, a flat display panel such as a liquid crystal display panel or an organic EL panel is provided with a tablet plate to thus permit the input of information such as characters and/or patterns through handwriting using, for instance, a data-inputting device such as a data-inputting pen and that the contents thus inputted into the device can be displayed on the display panel.

The display device is provided with a transparent protective plate on the side of the device facing the observer in order to maintain the desired display quality thereof while eliminating the occurrence of any local pressure possibly applied onto the same when inputting information into the device (see, for instance, FIG. 3 attached to Patent Document 1 or FIG. 1 attached to Patent Document 2). In this respect, a glass plate has preferably been used as such a protective plate in the light of the excellent characteristic properties thereof such as high mechanical strength, good weatherability and high light-transmittance.

It has been required for the foregoing display devices to increase the area thereof for the display and to reduce the weight thereof for its portable use and it has correspondingly been required for the protective glass plate used in the foregoing display devices to increase the area thereof and to reduce the thickness of the plate for the reduction of the weight thereof.

Patent Document 1: Japanese Un-Examined Patent Publication Hei 6-75213;

Patent Document 2: Japanese Un-Examined Patent Publication 2004-240548

DISCLOSURE OF THE INVENTION

Problems that the Invention is to Solve

As will be clear from FIG. 3 disclosed in Patent Document 1 and FIG. 1 disclosed in Patent Document 2, the protective glass plate for a display device is arranged while holding the glass plate a predetermined space away from parts of the device such as the display panel which face the same. The display device is used while it is placed horizontally or in its slightly inclined condition and the protective glass plate would be apt to deflect due to its own weight when the display device has a quite large display area and/or when the protective glass plate has a reduced thickness.

When the protective glass plate undergoes a deflection, the glass plate would be brought into contact with parts of the display device such as the display panel which face the same or the distance or space formed between the protective glass plate and the display panel or the like is considerably reduced. Accordingly, when a data-inputting device comes in contact with the glass plate, a problem arises such that the glass plate is correspondingly brought into contact with, for instance, the display panel and this in turn results in the contact between the protective glass plate and the display panel or the like. To prevent the occurrence of any such contact, it has been investigated to increase the magnitude of the foregoing space. In this case, however, an additional problem arises such that the thickness of the foregoing display device correspondingly increases and the weight thereof is likewise increased.

Such a problem of the deflection of the protective glass plate is liable to be conspicuous, in particular, when the size of the diagonal of the glass plate ranges from 30 to 55 cm and/or when the glass plate has a thickness ranging from 0.3 to 1.1 mm. Accordingly, it is an object of the present invention to provide an input/output-integrated display device in which a protective glass plate is hardly brought into contact with parts such as a display panel, which face the glass plate even when the glass plate undergoes any deflection.

Means for the Solution of the Problems

According to the present invention, there is thus provided an input/output-integrated display device equipped with a means for inputting information through handwriting wherein a protective glass plate is arranged as an outermost layer on the observation side of the device, while leaving a space between the protective glass plate and parts of the device facing the same, wherein the protective glass plate is one prepared by chemically reinforcing a glass plate which is produced according to the floating technique and has a Young's modulus ranging from 71 to 74 GPa and a Poisson's ratio ranging from 0.22 to 0.24, wherein the protective glass plate has a surface compression stress ranging from 200 to 650 MPa and a warpage ranging from 0.15 to 0.18% and wherein the protective glass plate is arranged in such a manner that the top surface of the glass plate faces the foregoing space.

In this respect, the foregoing surface compression stress and warpage are those determined according to the methods specified in JIS R3222 (2003).

The protective glass plate suitably used in the present invention is a reinforced glass plate prepared by chemically treating, in a molten salt bath at a high temperature, a glass plate such as a soda-lime glass plate prepared according to the floating technique.

Such a soda-lime glass plate is a glass plate widely used in the field of, for instance, the window glass plate and examples thereof include those called as $SiO_2$—$Na_2O$—$K_2O$—$CaO$—$MgO$—$Al_2O_3$ type glass plates and it has a Young's modulus ranging from 71 to 74 GPa and a Poisson's ratio ranging from 0.22 to 0.24.

When immersing the glass plate prepared according to the floating technique in a molten salt which contains alkali metal ions such as potassium, rubidium and cesium ions each having an ionic radius greater than that of sodium ions, sodium ions present in the glass plate are exchanged with alkali metal ions in the molten salt to thus form a compressed layer on the surface of the glass plate.

In case of the glass plate produced according to the floating technique, the ion-exchange rate observed for the side of the glass plate which comes in contact with a molten tin bath during the production thereof or the so-called bottom face is different from that observed for the opposite side of the glass plate or the so-called top face thereof. As a result, the surface compression stress is apt to be rather high on the top face. The present invention has been completed while paying attention to this phenomenon.

In the present invention, the chemically reinforced glass plate is arranged in such a manner that the top face thereof faces the foregoing space. Accordingly, in the input/output-integrated display device of the present invention, the protective glass plate is projected or convex towards the bottom face or the observation side when the device is vertically placed in a state free of any load. On the other hand, when the device is placed horizontally or in its inclined condition, it would be quite easy for the display device to prevent any contact between the protective glass plate and the parts of the device facing the same even when the glass plate undergoes any deflection.

Accordingly, the warpage of the protective glass plate should be set at a level ranging from 0.15 to 0.18% and preferably 0.16 to 0.17% while taking into consideration the prevention of any contact between them discussed above, as well as the visibility and the accommodation ability of the display device. If the warpage thereof is less than 0.15%, the resulting device is insufficient in the effect of preventing the foregoing contact, while if it exceeds 0.18%, additional problems arise such that surrounding objects are reflected on the protective glass plate and this in turn leads to the reduction of the visibility and that the accommodation ability of the device is impaired when the display device of the present invention is applied to, for instance, a notebook-sized personal computer. In addition, it is desirable that the compression stress observed on the top face of the protective glass plate is set at a level of not less than 1.03 times, preferably 1.03 to 1.15 times and particularly preferably 1.03 to 1.06 times that observed for the bottom face thereof.

The foregoing problem of the contact due to the deflection of the glass plate would be liable to be conspicuous, in particular, when the protective glass plate is thin or it has a wide area and accordingly, the technical idea of the present invention can quite effectively be applied to the display device of the present invention in which the protective glass plate has a thickness ranging from 0.3 to 1.1 mm, in particular, 0.3 to 0.7 mm and/or it has a relatively large surface area whose diagonal ranges from 30 to 55 cm, in particular, 40 to 55 cm.

Effects of the Invention

There would be observed such a tendency that the input/output-integrated display device of the present invention can easily prevent the occurrence of any contact between the protective glass plate and the parts of the device facing the glass plate due to the warpage of the same and thus the display device can be used over a long period of time. Moreover, in the display device of the present invention, the size of the space formed between them can substantially be reduced and therefore, the weight of the device can considerably be reduced.

BEST MODE FOR CARRYING OUT THE INVENTION

In the input/output-integrated display device equipped with a means for inputting information through handwriting (handwriting-input means), the protective glass plate is the outermost layer thereof on the observation side and a space is formed between the protective glass plate and the parts thereof facing the same.

FIG. 1 is a cross sectional view schematically showing the input/output-integrated display device 1 according to the present invention. More specifically, FIG. 1A shows the device horizontally arranged, while FIG. 1B shows the same device vertically arranged.

The display device 1 comprises a protective glass plate 2, a display panel 3 (a part facing the protective glass plate), a handwriting-input means 4a consisting of a tablet plate operated according to, for instance, a digitizer, and a data-inputting pen 4b.

The protective glass plate 2 used herein is an $SiO_2$—$Na_2O$—$K_{2O}$—$CaO$—$MgO$—$Al_2O_3$ type glass plate or a so-called soda-lime glass plate produced according to the floating technique and it is provided, on the surface, with a compressed layer formed by a chemical reinforcing treatment. This compressed layer has a compression stress value ranging from 200 to 650 MPa and preferably 200 to 600 MPa. To this end, the chemical reinforcing treatment is suitably carried out by immersing a raw glass plate in a molten salt bath maintained at a temperature ranging from 450 to 550° C. and preferably 460 to 530° C. for an immersion time ranging from 1 to 3 hours and preferably 1.5 to 2.5 hours.

Such a raw glass plate used for the preparation of the protective glass plate of the present invention has a strain-generating temperature, as determined according to the method specified in JIS R3103-2 (2001), ranging from 500 to 520° C. and therefore, it is preferred to set the temperature of the molten salt at a level near the strain-generating temperature at which the glass plate is liable to cause deformation or a temperature ranging from 490 to 530° C.

The protective glass plate 2 may, if necessary, be provided with a film having a low reflecting function and an anti-glare function and/or a polarizing film for the improvement of the contrast of display. Films having these functions may be realized by applying, to the protective glass plate 2, plastic sheets having the foregoing functions or may be formed by other means such as coating and vapor deposition techniques.

The display device 1 has a member for integrating, for instance, the protective glass plate 2 and the display panel 3. In this connection, it is preferred to arrange, around the periphery of the protective glass plate 2, a masking layer having a width sufficient for hiding the foregoing member and the distributing wires positioned on the peripheral side of the display device 1 and preferably a masking layer having an absorbance of not less than 3 and more preferably not less than 4.

This masking layer can be formed by, for instance, coating a composition which comprises a thermosetting synthetic resin, a pigment and a dye and then drying and/or heating the coated layer. Examples of such thermosetting synthetic resins usable herein are epoxy resins, acryl-silicone resins, alkyd resins, polyamide resins, and fluorine plastics.

Examples of the foregoing pigments which may be used in the present invention include iron oxide, copper oxide, chromium oxide, cobalt oxide, manganese oxide, aluminum oxide, zinc oxide, lead chromate, lead sulfate, and lead molybdate. These pigments may be used alone or in any combination of at least two of them.

Examples of the foregoing dyes usable herein include organic substances such as dioxazine type ones, phthalocyanine type ones, and anthraquinone type ones. The resulting mixture of these components are converted into a paste for coating the same using a medium and examples of such mediums are solvents such as diethylene glycol mono-butyl ether acetate and ethylene glycol mono-butyl ether. In addition, the composition may further comprise an accelerator for the curing reaction such as a modified aliphatic polyamine resin or N-butanol.

The foregoing masking layer preferably has a thickness of not more than 35 μm and, in particular, not more than 30 μm. This is because, if the thickness thereof is greater than 35 μm, a large step or difference in level is formed at the boundary between the surface of the masking layer and that of the glass substrate and accordingly, if forming a film such as that described above, air bubbles are apt to remain at the stepped portion.

The display panel 3 currently used is a liquid crystal display panel, but another display panel such as an organic EL display panel or a plasma display panel may sometimes be used optionally.

Examples of the practical use of the handwriting-input means 4a and the inputting pen 4b are introduced in Patent Document 2. By way of an example, FIG. 2 shows a tablet circuit introduced in Patent Document 2. The tablet circuit 41 as shown in FIG. 2 is constituted by the following device comprising parts represented by reference numerals 30 to 40. The part represented by the reference numeral 30 is a position-detecting zone in which a plurality of loop coils are distributed in the directions along the X- and Y-axes, and they are arranged as loop coils X1 to X40 and loop coils Y1 to Y40. These loop coils are connected to a selection circuit 31 so as to be able to select each particular loop coil.

The foregoing selection circuit 31 is connected to a transmit-receive switching circuit 32, the receive side (R) of the switching circuit 32 is connected to one of input terminals of a summing-amplifier circuit 34 (summing circuit) and the output terminal of the summing-amplifying circuit 34 is connected to a detector circuit 35. The output terminal of the detector circuit 35 is connected to an AD converter circuit 36 and the output terminal of the AD converter circuit 36 is connected to a CPU (central processing unit) device 37.

An oscillator 33 is one generating an alternating (AC) signal having a desired frequency, $f_0$, the AC signal is inputted to the transmission side (T) of the switching circuit 32 connected to the oscillator 33 and an alternating magnetic field having a frequency, $f_0$, is outputted from one of the loop coils present in the position-detecting zone 30. In addition, the reference numeral 38 represents a noise-detection coil which is connected to a variable gain-amplifier circuit 39. The output terminal of the variable gain-amplifier circuit 39 is connected to another input terminal of the summing-amplifier circuit 34.

Further a memory 40 is connected to the CPU device 37 and the latter device 37 outputs control signals (information) to the selection circuit 31, transmit-receive switching circuit 32 and the variable gain-amplifier circuit 39, respectively.

On the other hand, the inputting pen 42 (4b) is provided with a resonance circuit which can resonate at a frequency of $f_0$ and which includes a coil and a condenser. In the tablet circuit 41 and the position indicator (pen) 42 having the foregoing constructions, signals outputted from the position indicator (pen) 42 are converted into direct currents in the detector circuit 35, then the direct currents are converted into digital values in the AD converter circuit 36 and the digital values are processed in the CPU 37 to thus determine the coordinate of an indicated position.

EXAMPLES

Example 1

An $SiO_2$—$Na_2O$—$K_2O$—CaO—MgO—$Al_2O_3$ type glass plate or a so-called soda-lime glass plate which had characteristic properties as shown in the following Table 1 and had a thickness of 1.1 mm, a size of 25.5 cm×16.5 cm and a diagonal distance of 30.5 cm was produced according to the floating technique of a commercial scale using a raw composition comprising silica sand, feldspar, sodium carbonate, sodium sulfate, dolomite, limestone, and glass cullet and it was then subjected to a chemical reinforcing treatment in a molten salt of potassium nitrate under the conditions specified in the following Table 2. The both sides of the peripheral edges of this glass plate were coated with a liquid preparation [GLS-912 SUMI; available from Teikoku Ink Mfg. Co., Ltd.] for forming a masking layer, followed by heating the coated film at 150° C. to thus give a protective glass plate provided thereon with a masking layer having a width of 10 mm and a thickness of 25 μm on the peripheral edges thereof. The resulting protective glass plate was inspected for the compression stress value and warpage. The results thus obtained are listed in Table 2.

An input/output-integrated display device having a structure as shown in FIG. 1 was assembled using the resulting protective glass plate and a liquid crystal display panel as the display panel 3 and then the size of the space formed between the protective glass plate and the display panel was determined using a commercially available laser range finder when the display device was horizontally placed. In this respect, the display device was so designed that the size of the space was equal to 2.5 mm at the edge portion of the glass plate. The results thus determined are summarized in the following Table 3. There was not observed any position at which the size of the space was found to be less than 2.5 mm even when the device was horizontally placed and further the protective glass plate was never brought into contact with the liquid crystal display panel even when data were manually inputted while pressing the protective glass plate using an inputting pen.

TABLE 1

| | |
|---|---|
| Density (g/cm$^3$) | 2.49 |
| Young's Modulus (GPa) | 72 |
| Poisson's Ratio | 0.23 |
| Coefficient of Thermal Expansion (10$^{-7}$/° C.) | 86 |
| Strain-Generating Temp. (° C.) | 512 |
| Annealing Point (° C.) | 553 |
| Softening Point (° C.) | 733 |

TABLE 2

| Ex. No. | Prod. Cond. 1 Temp. (° C.) of Molten Salt | Prod. Cond. 2 Immersion Time (hr) | Result 1 Compression stress (top face) (MPa) | Result 2 Compression stress (bottom face) (MPa) | Result 3 Result 1/ Result 2 | Result 4 Warpage (%) |
|---|---|---|---|---|---|---|
| 1 | 520 | 2.5 | 213 | 202 | 1.05 | 0.17 |
| 2 | 470 | 2 | 620 | 598 | 1.04 | 0.16 |
| 3 | 490 | 1.5 | 512 | 463 | 1.11 | 0.18 |

TABLE 2-continued

| Ex. No. | Prod. Cond. 1 Temp. (° C.) of Molten Salt | Prod. Cond. 2 Immersion Time (hr) | Result 1 Compression stress (top face) (MPa) | Result 2 Compression stress (bottom face) (MPa) | Result 3 Result 1/ Result 2 | Result 4 Warpage (%) |
|---|---|---|---|---|---|---|
| 1* | 510 | 2 | 310 | 248 | 1.25 | 0.19 |
| 2* | 510 | 2 | 310 | 248 | 1.25 | 0.14 |

*Comparative Example

TABLE 3

| Ex. No. | Central Point/mm | Pont A (*1) | Point B (*2) | Point C (*3) | Point D (*4) |
|---|---|---|---|---|---|
| 1  | 3.2 | 2.7 | 2.7 | 2.7 | 2.7 |
| 2  | 2.8 | 2.6 | 2.6 | 2.6 | 2.6 |
| 3  | 3.3 | 2.8 | 2.8 | 2.8 | 2.8 |
| 1* | 4.0 | 3.0 | 3.0 | 3.0 | 3.0 |
| 2* | 1.1 | 2.0 | 2.0 | 2.0 | 2.0 |

*Comparative Example
(*1) Pont A: A point 50 mm apart from the corner of the glass plate along the diagonal thereof;
(*2) Point B: A point 50 mm apart from the corner of the glass plate along the diagonal thereof;
(*3) Point C: A point 50 mm apart from the corner of the glass plate along the diagonal thereof;
(*4) Point D: A point 50 mm apart from the corner of the glass plate along the diagonal thereof.

Example 2

The same procedures used in Example 1 were repeated except that the thickness of the raw glass plate was changed to 0.55 mm and that the glass plate was chemically reinforced under the conditions specified in Table 2. The conditions used for the production of a protective reinforced glass plate and the characteristic properties thereof observed are listed in Table 2 and the results observed for the input/output-integrated display device prepared using the reinforced glass plate are summarized in Table 3. There was not observed any position at which the size of the space formed between the protective glass plate and the display panel was found to be less than 2.5 mm even when the device was horizontally placed and further the protective glass plate was never brought into contact with the display panel even when data were manually inputted while pressing the protective glass plate using an inputting pen.

Example 3

The same procedures used in Example 2 were repeated except that the glass plate was chemically reinforced under the conditions specified in Table 2. The conditions used for the production of a protective reinforced glass plate and the characteristic properties thereof observed are listed in Table 2 and the results observed for the input/output-integrated display device prepared using the reinforced glass plate are summarized in Table 3. There was not observed any position at which the size of the space formed between the protective glass plate and the display panel was found to be less than 2.5 mm even when the device was horizontally placed and further the protective glass plate was never brought into contact with the display panel even when data were manually inputted while pressing the protective glass plate using an inputting pen.

Comparative Example 1

The same procedures used in Example 2 were repeated except that the glass plate was chemically reinforced under the conditions specified in Table 2. The conditions used for the production of a protective reinforced glass plate and the characteristic properties thereof observed are listed in Table 2 and the results observed for the input/output-integrated display device prepared using the reinforced glass plate are summarized in Table 3. There was not observed any position at which the size of the space formed between the protective glass plate and the display panel was found to be less than 2.5 mm even when the device was horizontally placed and further the protective glass plate was never brought into contact with the display panel even when data were manually inputted while pressing the protective glass plate using an inputting pen. When vertically placing the resulting display device, however, the visibility was greatly impaired since the surrounding objects were considerably reflected on the protective glass plate. Moreover, when the display device of the present invention was used in a notebook-sized personal computer and the notebook-sized personal computer was folded or accommodated, a problem arose such that the protective glass plate was found to be brought into contact with the display panel.

Comparative Example 2

The same procedures used in Example 1 were repeated except that the glass plate was chemically reinforced under the conditions specified in Table 2. The conditions used for the production of a protective reinforced glass plate and the characteristic properties thereof observed are listed in Table 2 and the results observed for the input/output-integrated display device prepared using the reinforced glass plate are summarized in Table 3. The size of the space formed between the glass plate and the display panel was found to be less than 2.5 mm at the central portion of the device when the device was horizontally placed and further the protective glass plate was found to be brought into contact with the display panel when data were manually inputted while pressing the protective glass plate using an inputting pen.

DESCRIPTION OF THE REFERENCE NUMERALS

Figure 1A:
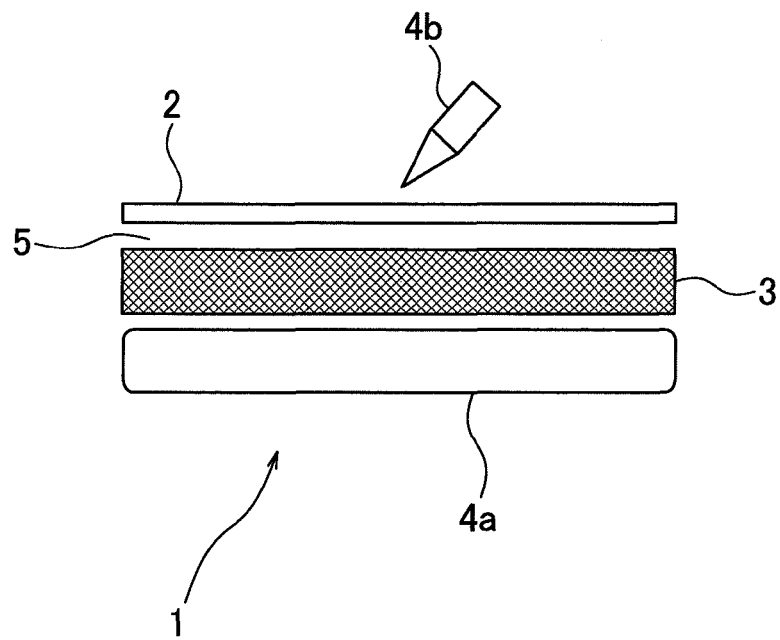
FIG. 1A is a cross sectional view schematically showing the input/output-integrated display device according to the present invention and shows the device horizontally arranged.
Figure 1B:
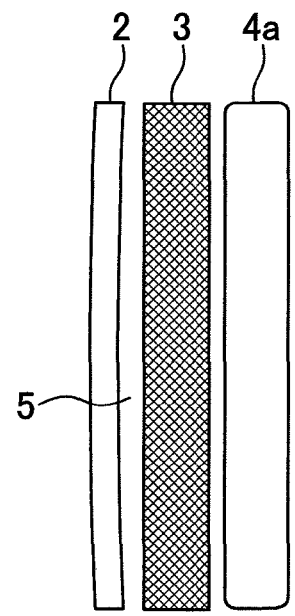
FIG. 1B is a cross sectional view schematically showing the input/output-integrated display device according to the present invention and shows the same device vertically arranged.
Figure 2:
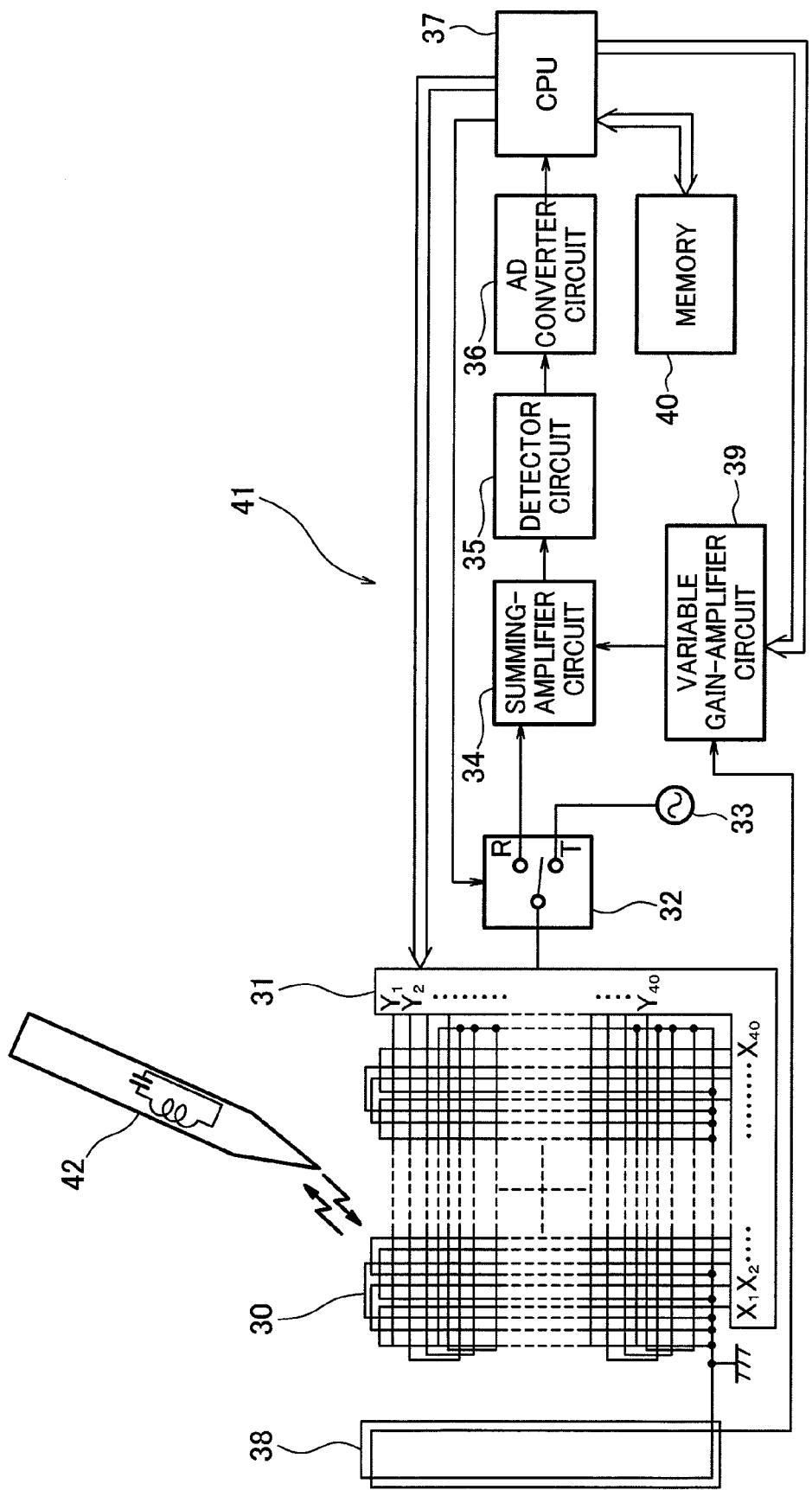
FIG. 2 is a diagram for showing an embodiment of a tablet circuit for realizing the functions of a handwriting-input means 4a and an inputting pen 4b.

1 . . . Input/output-integrated display device;
2 . . . Protective glass plate;

3 ... Display panel (a part facing the protective glass plate);
4a ... Handwriting-input means;
4b ... Inputting pen;
5 ... Space formed between the protective glass plate and the part facing the same plate.

What is claimed is:

1. An input/output-integrated display device comprising a display panel, equipped with a means for inputting information through handwriting, characterized in that
   a protective glass plate is arranged as an outermost layer on the observation side of the device, while leaving a space between the protective glass plate and a part of the display panel of the device facing the same;
   the protective glass plate is a chemically reinforced glass plate prepared by immersing, in a molten salt bath, a glass plate which is produced according to the floating technique and has a Young's modulus ranging from 71 to 74 GPa and a Poisson's ratio ranging from 0.22 to 0.24 to thus chemically reinforce the same;
   the protective glass plate has the side serving as the top face upon the production of the glass plate according to the floating technique and the bottom face side opposite to the top face side;
   the protective glass plate has a surface compression stress, on the top face side, ranging from 200 to 650 MPa;
   the protective glass plate is arranged in such a manner that the top face thereof faces the foregoing space, and the bottom face thereof faces the observation side;
   the protective glass plate is deflected towards the bottom face side at a warpage ranging from 0.15 to 0.18%, when it is vertically placed; and
   the protective glass plate is never brought into contact with any part of the display panel even when data is manually inputted while pressing the protective glass plate using the means for inputting information through handwriting.

2. The input/output-integrated display device as set forth in claim 1, wherein the surface compression stress, on the top face side, is not less than 1.03 times that observed on the bottom face side.

3. The input/output-integrated display device as set forth in claim 1, wherein the thickness of the protective glass plate ranges from 0.3 to 1.1 mm.

4. The input/output-integrated display device as set forth in claim 1, wherein the size of the diagonal of the protective glass plate ranges from 30 to 55 cm.

* * * * *